March 25, 1958 H. W. MADDEN 2,828,154
CAN STACKING FORK
Filed May 21, 1956
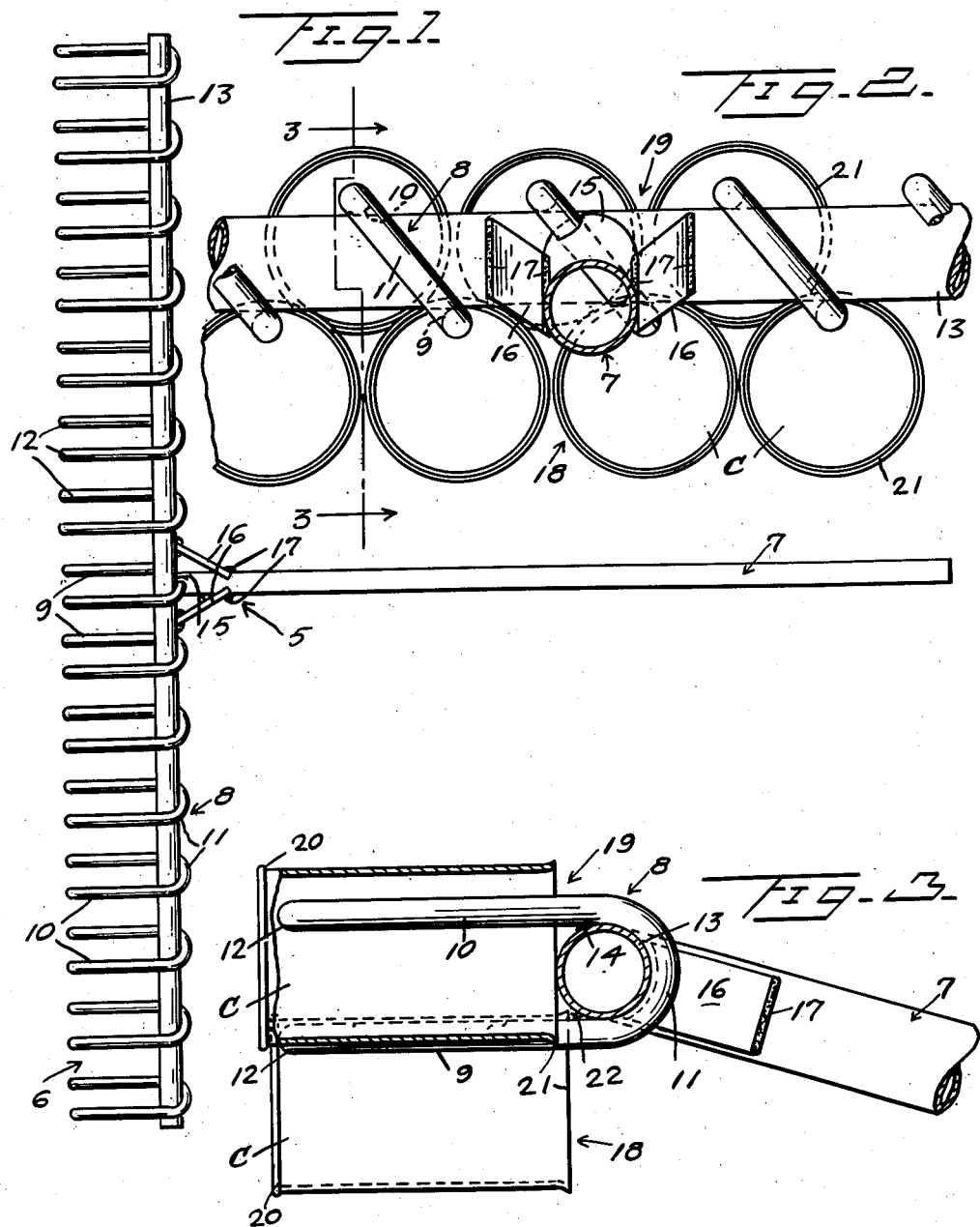
INVENTOR
H. W. Madden
BY John N. Randolph
ATTORNEY

2,828,154

CAN STACKING FORK

Homer W. Madden, Hanover, Ind.

Application May 21, 1956, Serial No. 586,235

6 Claims. (Cl. 294—15)

This invention relates to a fork of novel construction which is especially adapted for use in picking up, carrying and stacking simultaneously two tiers of cans and which may also be employed for carrying, picking up and stacking a single row or course of cans.

Another object of the invention is to provide a fork especially constructed for picking up two tiers of cans the cans of the upper tier of which have their enlarged ends hooked behind the complementary enlarged ends of the cans of the lower tier and in proper position to be stacked so that there will be no tendency of the cans falling forward from the stack while thus inter-engaged or hooked.

Another object of the invention is to provide a fork including a head portion cooperating with the fork tines or prongs for maintaining the cans of the two tiers properly inter-engaged or hooked while supported by the fork.

A further object of the invention is to provide a can handling fork including a handle portion disposed at an angle to the plane of the fork head to facilitate the handling of cans to be stacked at different levels.

A further object of the invention is to provide a fork which is extremely light in weight yet of adequate strength and durability to function effectively for its intended purpose.

Other objects and advantages of the invention will hereinafter become more fully apparent from the following description of the drawing, illustrating a presently preferred embodiment thereof, and wherein:

Figure 1 is a plan view of the can stacking fork;

Figure 2 is an enlarged fragmentary sectional view thereof taken transversely through the handle and looking toward the fork head, and Figure 3 is a sectional view, taken substantially along a plane as indicated by the line 3—3 of Figure 2.

Referring more specifically to the drawing, the can stacking fork in its entirety and comprising the invention is designated generally 5 and generally includes a head 6 and a handle 7.

The head 6 includes a plurality of corresponding substantially U-shaped members 8 each of which is formed of stock which is preferably of circular cross section and which may be in the form of a rod or tube. Each U-shaped member includes spaced substantially parallel end portions 9 and 10 and a substantially semicircular intermediate or bight portion 11. The end portions 9 and 10 form fork tines or prongs of the same length and which are preferably provided with rounded distal ends 12. The head 6 also includes an elongated tine supporting member 13 preferably in the form of a tube of circular cross section and having an outer diameter somewhat less than the spacing between the tines 9 and 10. The U-shaped members 8 are disposed on the elongated supporting member 13 in spaced apart relation to one another and with the inner sides of the bight portions 11 thereof engaging against said member 13. Said U-shaped members 8 are canted in the same direction relative to the supporting member 13 so that the bight portions 11 thereof will conformably engage around approximately a half of the circumference of the supporting member 13. The members 8 as thus disposed are secure to the supporting member 13 in any suitable manner as by soldering or welding, as indicated at 14 in Figure 3. The members 8 as thus mounted on the supporting member 13 are positioned so that the tines 9 and 10 are offset or staggered relative to one another, as seen in Figures 1 and 2.

One end of the elongated handle 7 is suitably secured to the supporting member 13 intermediate of the ends of the head 6 and extends therefrom in a direction away from the tines or prongs 9 and 10. As seen in Figures 1 and 2, the intermediate or bight portion 11 of the intermediate member 8 may extend through the inner end 15 of the handle 7, which is secured to the supporting member 13. A pair of braces 16 brace the handle 7 relative to the supporting member 13 and extend diagonally between a portion of the handle 7 and portions of the member 13. The ends of the braces 16 are secured to the parts 7 and 13 in any suitable manner, as by soldering or welding, as seen at 17. As best illustrated in Figure 3, the axis of the handle 7 is disposed at a slight angle to the plane of the head 6 or to the axes of the tines 9 and 10.

The parts 7 and 13 are preferably formed of aluminum tubing so that the fork 5 will be light in weight yet of adequate strength and rigidity to support a number of cans C corresponding to the number of tines or prongs 9 and 10.

While the fork 5 is of general utility in connection with picking up, carrying and stacking either one or two tiers of cans C, it is especially adapted for use with the double tier can conveying machine as disclosed in my copending application, Serial No. 586,236, filed May 21, 1956.

The fork 5 is normally supported by the handle 7 and with the head 6 disposed in substantially a horizontal plane and so that the tines 10 will constitute the upper tier of tines. With the fork thus disposed, the tines 9 and 10 due to their staggered disposition with respect to one another, as seen in Figures 1 and 2, can be inserted into a group of cans C forming a lower tier 18 and an upper tier 19 and so that a tine 9 will engage each can C of the lower tier and a tine 10 will engage each can C of the upper tier. The beads 20 of the cans of the upper tier are engaged behind the beads 20 of the closed ends of the cans of the lower tier and the flared or flanged open ends 21 of the upper tier cans are offset inwardly from the flared ends 21 of the cans of the lower tier, so that the cans are correctly arranged for stacking, and which is accomplished automatically by the machine disclosed in my aforementioned application. As best illustrated in Figure 3, when the tines or prongs are engaged in the cans C of the lower tier 18 and upper tier 19, a portion of the flared open end 21 of each lower tier can will be disposed in the notch 22 formed by an inner end portion of the tine 9, which engages said can, and an adjacent portion of the member 13, and said flared or flanged portion 21 will be disposed under a part of the member 13. Likewise, portions of the flared open ends 21 of each can C of the upper tier will abut against the member 13 to retain the upper tier cans in offset relation to the cans of the lower tier, as seen in Figure 3. With the tines 9 and 10 thus disposed in the cans of the two tiers, said cans can be lifted by the fork 5 and carried to a position for stacking. The downwardly inclined disposition of the handle 7 from the head 6 as seen in Figure 3 enables the user to readily stack the cans C supported by the fork in a position above shoulder level.

It will be understood that the fork 5 will normally be tilted to a greater extent than as shown in Figure 3 while cans are being carried thereby so that the tines 9 and 10 will be inclined upwardly toward their distal ends 12.

It will also be readily apparent that the fork 5 can be inverted from its position of Figure 3 when utilized for stacking cans at a low level, as for example adjacent the level of a floor surface on which the operator is standing. Thus, due to the angular disposition of the handle 7 relative to the head 6, less reaching and stooping will be required of the operator in utilizing the fork 5 than if the handle was disposed in the plane of the head 6.

Various modifications and changes are contemplated and may obviously be resorted to, without departing from the function or scope of the invention as hereinafter defined by the appended claims.

I claim as my invention:

1. A can stacking fork comprising an elongated head including a plurality of tines and a single elongated tine supporting member, said tines being secured to said supporting member and extending laterally therefrom in the same direction and being disposed in spaced apart substantially parallel relation to one another, and a handle having one end secured to said tine supporting member and extending from the head in a direction away from said tines, said head having an upper tier and a lower tier of tines extending from above and beneath said tine supporting member, respectively, the tines of said tiers being disposed in spaced apart substantially parallel relation to one another, and the tines of the two tiers of tines being staggered relative to one another.

2. A can stacking fork as in claim 1, said tine supporting member being of circular cross section, said tines being disposed substantially tangentially to the tine supporting member and combining with portions of the periphery thereof to form notches adapted to receive flared portions of the open ends of cans supported on the tines of the lower tier.

3. A can stacking fork as in claim 2, a portion of the tine supporting member disposed between the tines of the upper and lower tiers being adapted to engage against portions of the flared open ends of cans of an upper tier into which the tines of the upper tier extend for retaining the upper tier of cans in outwardly offset relation to the lower tier of cans whereby the ends of the cans of the upper tier of cans are disposed behind the corresponding ends of the cans of the lower tier of cans.

4. A can stacking fork as in claim 1, said fork head including a plurality of U-shaped members having substantially parallel end portions forming the upper and lower tines, said U-shaped members being canted relative to the tine supporting member for offsetting the tines of the two tiers relative to one another.

5. A can stacking fork as in claim 4, said tine supporting member being of circular cross section, said U-shaped members having substantially semicircular bight portions each conformably engaging substantially a half of the circumference of the tine supporting member when the U-shaped member is canted relative to the tine supporting member, and means for securing said U-shaped members to the tine supporting member.

6. A can stacking fork as in claim 1, the outer ends of the tines of both tiers being disposed substantially coplanar.

References Cited in the file of this patent

UNITED STATES PATENTS

| | | |
|---|---|---|
| 2,151,281 | Stalkfleet | Mar. 21, 1939 |
| 2,795,453 | Nordquist | June 11, 1957 |